United States Patent [19]
Dietzel

[11] Patent Number: 5,954,779
[45] Date of Patent: Sep. 21, 1999

[54] DRAG TORQUE CONTROL METHOD IN A DIESEL ELECTRIC DRIVE SYSTEM AND DRIVE SYSTEM

[75] Inventor: Bernd Dietzel, Syrgenstein, Germany

[73] Assignee: Voith Turbo GmbH & Co. KG, Heidenheim, Germany

[21] Appl. No.: 08/985,827

[22] Filed: Dec. 5, 1997

[30] Foreign Application Priority Data

Dec. 6, 1996 [DE] Germany ............................ 196 50 570

[51] Int. Cl.$^6$ ................................................. B60K 17/344
[52] U.S. Cl. .................................. 701/87; 701/22; 701/51; 701/53; 701/54; 180/65.4; 180/65.3; 180/65.8; 180/197; 180/6.5; 180/6.44; 180/165; 318/138; 318/139; 290/40
[58] Field of Search ........................... 701/87, 22, 51, 701/53, 54; 180/165, 6.44, 6.5, 197, 65.4, 65.3, 65.8; 318/138, 139; 290/40

[56] References Cited

U.S. PATENT DOCUMENTS

| 4,856,610 | 8/1989 | Lieber et al. ............................ 180/197 |
| 4,995,139 | 2/1991 | Suzuki ..................................... 73/116 |
| 5,418,437 | 5/1995 | Couture et al. ......................... 318/139 |
| 5,443,130 | 8/1995 | Tanaka et al. .......................... 180/65.6 |
| 5,492,192 | 2/1996 | Brooks et al. ........................... 180/165 |
| 5,730,238 | 3/1998 | Tamaki et al. .......................... 180/65.8 |
| 5,841,201 | 11/1998 | Tabata et al. ........................... 180/65.4 |

*Primary Examiner*—William A. Cuchlinski, Jr.
*Assistant Examiner*—Olga Hernandez
*Attorney, Agent, or Firm*—Randall J. Knuth

[57] ABSTRACT

A method for influencing the drive torque in a drive train comprising at least one electric motor at least indirectly driving one driven wheel, an internal combustion engine, and an electric machine allowing mechanical coupling to said engine operating a generator and a motor. Each selected motor allows electric coupling to the generator.

The system creates a device for presetting a driver's desire for movement of the vehicle, coupled at least indirectly to an actuator of the internal combustion engine. According to the invention, the electric motors are operated as generators, at least upon release of the system for presetting a driver's desire. Drawn from the driven wheels by the electric motors is a first output portion that is generated in generator mode and fed to the electric machine for driving the internal combustion engine. The first output portion is selected such that the internal combustion engine operates at least at a speed of rotation greater than or equal to idling speed of rotation and at which the fuel supply is interrupted completely by means of a control coordinated with the internal combustion engine.

27 Claims, 5 Drawing Sheets

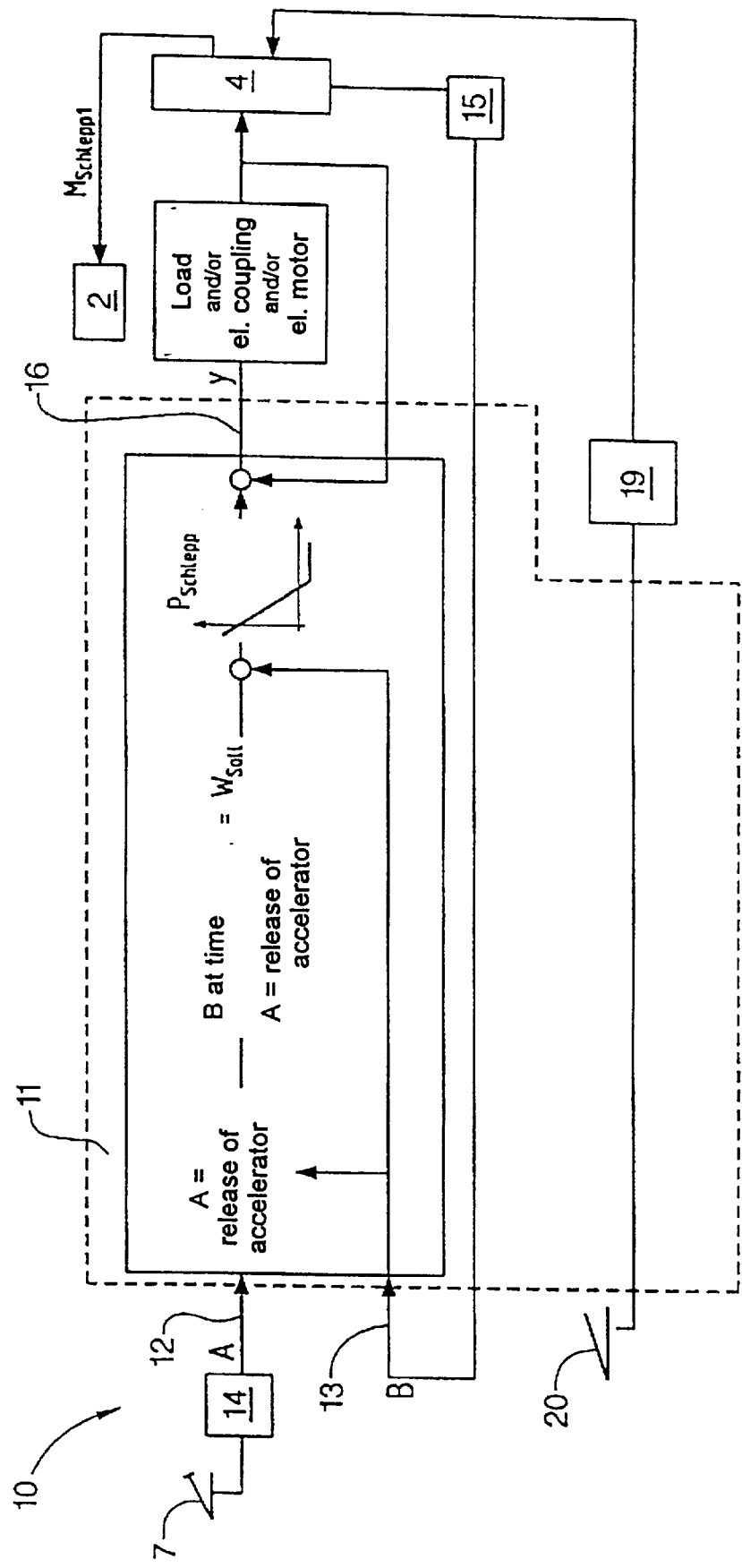

Accelerator position

DRAG TORQUE CONTROL METHOD IN A DIESEL ELECTRIC DRIVE SYSTEM AND DRIVE SYSTEM

BACKGROUND OF THE INVENTION

1. Field of the Invention

The invention relates to a drag torque control method in a vehicle, additionally to a drive system.

2. Description of the Related Art

Explanation of definitions used uniformly hereafter:

Drive output $P_{AM}$ is the output generated by the internal combustion engine;

Drive torque $M_{AR}$ torque generated on the driven wheels;

Travel torque $M_{drive}$ is the torque which at released accelerator and with the vehicle coasting is effective, due to its kinetic energy, on the wheel and introduced in the drive train; and Drag torque $M_S$ is the torque for surmounting the entirety of resistances in the drive train which counteracts the travel torque for mechanical output transfer which includes notably the inherent friction of the internal combustion engine and transmission.

Conventionally structured automotive drive trains include at least one drive engine, notably an internal combustion engine, as well as apparatuses for torque transmission and conversion coupled to the power output. Generally, the internal combustion engine is by way of a clutch coupled to a transmission whose output may be connected to the driven wheels at least indirectly, by way of further output-transmitting components. The driver's desire for vehicle acceleration is realized via an actuating system designed, e.g., as accelerator lever or pedal. The actuating system, in turn, is coupled at least indirectly to the output actuator of the engine.

In normal operation, the wheels are driven by output transmission from the engine via the clutch and transmission to the driven wheels. However, not the entire output generated by the internal combustion engine can be transmitted to the driven wheels. A first portion of the output generated by the internal combustion engine is needed for surmounting the resistances associated with the overall system, notably the inherent resistances of the internal combustion engine and the output-transmitting components. Only the further, second portion of the output can then be utilized for acceleration or maintaining a specific vehicle speed.

The actuating system is generally coupled directly to the output actuator of the internal combustion engine, allowing the driver to express his desire for acceleration or for maintaining a specific speed. Complete release of the accelerator pedal or accelerator lever by the driver occasions an adjustment on the output actuator such that, except for the first output portion for maintaining idling operation, no further second output portion is generated. In level travel, the result is that no further drive torque is transmitted from the engine to the driven wheels. On the driven wheels, however, a travel torque is effective. This is the torque which at released accelerator pedal or accelerator lever is effective on the wheel and introduced in the drive train with the vehicle coasting, due to its kinetic energy. Part of the travel torque effective on the wheels is introduced in the drive train, causing the engine to be driven from the power output end, that is, from the wheels. This torque is counteracted by the drag torque engendered by the resistances in the drive train. Depending on the magnitude of the kinetic energy of the vehicle, the torque introduced in the drive train may serve to put the engine in deceleration, which expresses itself, however, in a reduced kinetic energy of the vehicle, that is, the travel speed. Especially in travel down an incline with the actuating system released, an increase of the drag torque counteracting the travel torque is noted, due to the kinetic energy increase of the vehicle by the effect of the gradient power output, along with an increase of the travel torque. The engine is put in drag, that is, in deceleration operation. The increasing output portion required to drive the internal combustion engine causes a drop in travel speed. At this time, the vehicle is being braked. Since the engine is in deceleration driven entirely via the drive train, an appropriately configured motor control is provided which controls the amount of fuel consumed by the engine to zero.

Drive systems with diesel electric drive configuration display a different behavior. They include an engine designed as a diesel engine, an electric machine mechanically coupled to the engine and operated as a generator, and at least one electric motor driving at least one driven wheel at least indirectly, said electric motor being coupled electrically to the electric machine. The drag torque acting on the driven wheels, such as occurring with a mechanical drive train, is in diesel electric drive systems not given automatically, due to the mechanical decoupling. Automatic fuel savings based on the travel performance are not possible, since the internal combustion engine must upon accelerator pedal release be operated at least in idling.

Therefore, an objective underlying the invention is to develop a method for influencing, respectively tuning, the drag torque of a vehicle with a drive system including an arrangement of internal combustion engine and generator, in which method a fuel-optimized travel performance analogous to conventional drive systems can be realized with means as simple as possible and at low cost. The engineering as well as control-related expense need to be kept low.

SUMMARY OF THE INVENTION

Generated and adjusted with a diesel electric drive system, according to the invention, is a drag torque that is always sufficient to put the internal combustion engine in deceleration and operate it at the speed of rotation required to trigger the deceleration shutoff by means of an appropriate control associated with the internal combustion engine. To that end, the electric motors driving the driven wheels at least indirectly, designed preferably as a transverse-flow machine, are operated in generator mode at either released accelerator pedal or accelerator lever, and/or at actuation of a system for activating the drag torque control or regulation function. In generating mode, power is drawn from the drive train on the driven wheels and transmitted to the engine by way of the electric coupling between the wheel drive motors configured as electric motors and the electric machine operated as generator and following the internal combustion engine. The operating mode of said machine being in this case that of a motor for purposes of driving the internal combustion engine. Utilized in the process, however, is only a first output portion which is drawn by the generator operation of the electric motors driving the driven wheels at least indirectly. The output portion is always at least of a size such that an operation of the internal combustion engine at a speed of rotation equal to or greater than idling speed of rotation of the internal combustion engine is guaranteed. The size of the speed of rotation depends on a control associated with the internal combustion engine, which interrupts the fuel supply upon reaching this speed of rotation. The latter may be set invariably or variably by the control, coordinated with the internal combustion engine. At least a first output portion, required to realize at least idling operation, is thus presented to the internal combustion engine by the electric motors operating as generators.

The inventors have recognized that a complete imitation of the behavior of a vehicle with a conventional drive train is unsuited for diesel electric drives, by operation of the wheel drive motors configured as electric motors in generator operation, where a drag torque is selected that always increases at increasing speed of travel. While the output drawn from the electric motor serving as drive motor of the wheels or from the drive motors on the wheels in generator operation can be used to put the internal combustion engine in deceleration, by way of the electric machine operated as generator, whereby the fuel consumption which otherwise would be necessary for operating the engine, i.e., the internal combustion engine, in idling, may drop to zero. A considerable drawback is, however, that the output portion drawn from the driven wheels by the generator operation of the electric motors would with increasing travel torque increase as well, thereby causing a reduction of the travel speed of the vehicle. Neither does another option—complete freewheeling with the accelerator pedal released—produce acceptable results. Due to the decoupling between driven wheels and engine, no or only an insignificant drag torque is being generated by the electric motors coupled to the wheels. The option of a so-called deceleration shutoff is then not given. In travel down a gradient, such a solution results in increasing acceleration of the vehicle, which the driver is able to compensate for only by active actuation of a further brake system.

In contrast, the generation of a drag torque according to the invention and its control or regulation offers the option of putting the internal combustion engine with a released accelerator pedal or accelerator lever always in deceleration operation, making a deceleration shutoff possible and thus reducing the fuel consumption. In level and uphill travel, the solution according to the invention causes only an output withdrawal from the drive train, via the electric motors operated as generator, that is just sufficient to guarantee at least still the idling of the engine and to reduce the fuel delivery for the internal combustion engine to zero, while only unnoticeable retardations of the vehicle occur in level or uphill travel, due to the reduction of the kinetic energy of the vehicle limited by the output supply of the internal combustion engine.

The electric motors driving the driven wheels at least indirectly and/or the electric machine capable of being operated as a generator are preferably configured as transverse-flow machines. The wheels are driven by way of at least one electric motor. The output generated by it can then be split among both wheels. Conceivable as well is coordinating one electric motor with each wheel.

A preferred improvement of the inventional solution provides at least for travel down a gradient to control the drag torque such that the vehicle speed is limited to the value measured at the moment of letting up on the accelerator pedal. The drag torque control is part—at least for downhill travel—of the control to constant speed of travel. The vehicle control tries in this case not to exceed the speed recognized at the moment of selecting the function, by appropriately metered brake intervention with the brake pedal subordinated to the brake. That is, from the electric motors capable of generator operation there is as much output drawn as is necessary, besides maintaining idling operation or operation at the speed of rotation required for deceleration shutoff, to keep the speed of travel constant.

A further conceivable option consists in not using the speed as a command variable, but a selectively defined acceleration or retardation. For example, a defined acceleration may be allowed which, e.g., may depend on the speed of travel.

Such a solution represents an increasing driver relief, achieving notably an increase in motoring safety, in addition to increased operating comfort. The control and regulation related expense can be kept very low, since no additional brake systems must be activated.

In terms of equipment, a control or regulating system is coordinated with the drive system. It may be an integral part of a central travel control. The control or regulating system comprises at least one controller featuring at least a first and a second input and at least a first output. Said first input is coupled to the system for at least indirect detection of the state of actuation of the actuating member for presetting a driver desire as regards a specific speed or acceleration. The actuating member may be configured, e.g., as an accelerator pedal or accelerator lever. The second input is coupled to a system for detection of a variable describing, at least indirectly, the actual speed of travel.

The drag torque in the drive train is controlled and adjusted depending at least on these two input variables. The output drawn from the driven wheels by the generator operation of the electric motors and delivered to the electric machine must always be sized such that the power delivered to the internal combustion engine is sufficient to at least keep it idling or to operate it at least at the speed of rotation at which the deceleration shutoff sets in. Consequently, an actuating signal for activating the supply of the loads, presently the internal combustion engine, or of units coordinated with them, preferably the electric coupling, is emitted at the output of the control or regulating apparatus.

When in downhill travel a specific speed of travel prevailing at the time of accelerator pedal or accelerator lever release and/or definable acceleration is additionally meant to be kept constant, said travel speed and/or acceleration is assigned the function of a set value of a control to constant speed of travel. Assigned to said speed or acceleration that is to be kept constant is a specific drag torque, in contingence on further continually detected input variables for example, the gradient, which drag torque opposes by way of the generator operation of the electric motors the travel torque and avoids an increase of the speed of travel. The drag torque control is in this case part of the controlled system of a feedback control for maintaining a constant speed of travel in downhill travel. The braking energy generated additionally in this case by the generator operation of the electric motors, determined essentially by the second output portion, can be stored in an accumulator unit.

Further configuration options provide, in the presence of at least one additional brake system for its actuation and inclusion in the drag torque control. This additional brake system may be configured, e.g., as a mechanical or hydraulic brake system. Actuation of it may be granted priority over the drag torque control. In this case, either the drag torque control is, upon actuation of the additional brake system, first deactivated to the effect that merely the idling operation of the engine is maintained or, secondly, the drag torque is left as adjusted at the time of actuation of the additional brake system. In the latter case, the braking torque generated by means of the drag torque control can be superimposed additively on the braking torque to be generated in keeping with the actuation of the additional brake system. The brake system generates then an additional braking torque, resulting in a reduced speed of travel. Other combination or coordination options of both braking torques are conceivable. The actual speed prevailing upon completion of actuation of the additional brake system is set, or stored, as the new set value, that is, as a new command variable of the feedback control. The drag torque to be generated is then adapted and adjusted according to this speed. This makes it possible to considerably facilitate the operation for the driver, and otherwise eliminate required further adaptation braking actions by actuation, e.g., of a foot pedal or manual lever for maintaining or correcting the speed.

Another configuration option consists in making in the selection of the additional brake system, a maximum selection between the braking torque generated by the drag torque control and the braking torque generated with the additional brake system.

The inventional method of drag torque control as a function can be activated as the driver releases the actuating member—example, the accelerator pedal or accelerator lever—and/or as the driver actuates a system allowing him to express his desire for activation of the drag torque control to the electronic vehicle control. This function can be deactivated with a subsequent actuation of the accelerator pedal or accelerator lever and/or by deactivating the system by means of which the driver is able to express his desire for activation of the drag torque control to the electronic vehicle control.

Activation or deactivation of the function of the drag torque control occurs preferably not abruptly at actuation or release of the actuating members, or systems. This can be realized, e.g., by means of a programmed function allowing a sliding transition as regards the drive torque prevailing before or after in the drive train to the torque generated by the drag torque control.

The sliding transition from the drive torque or drag torque prevailing in the drive train to the drag torque or drive torque prevailing thereafter can be realized, e.g., also such that the drive torque desired by the driver becomes zero already at a specific angular position of the accelerator pedal or accelerator lever other than a limit position, by activation of the output actuator of the internal combustion engine. From this specific angular position forward, up to the limit position of the accelerator pedal or accelerator lever, the torque generated by the drag torque control increases continuously. Analogously, the process takes place also in deactivating the drag torque control, that is, e.g., at renewed actuation of the accelerator pedal or accelerator lever. Given therein is the option of presetting the specific angular position of the accelerator pedal or accelerator lever already in contingence on various variables affecting the state of travel, for example, the speed of travel, or preset it anew at each actuation. Fixedly preset may also be a specific angular position which, e.g., is variable with respect to its size by a factor.

The option of setting the drive torque to zero at a specific angular position of the accelerator pedal or accelerator lever which, however, is not its limit position, may be combined with the option of transition by means of a programmed function.

Another variant of not effecting an abrupt transition to activation/deactivation of the drag torque control is characterized in that this transition is made under allowance for the speed of rotation of the internal combustion engine. Allowance for the speed of rotation of the internal combustion engine is made in a way such that at a speed of rotation of the internal combustion engine ranging significantly above idling or above the speed of rotation which in deceleration operation triggers a deceleration shutoff the transition to the function of drag torque control takes place with a delay.

Further, an option is given of including the inventional method of drag torque control in further feedback controls, for example, a feedback control to constant speed of travel. The drag torque control and the combined drag torque control with the actuation of further brake systems may be combined here also with the speed limitation control by throttling the internal combustion engine down. Priority of the individual control system may be determined in keeping with operational requirements and the desired travel (speed) performance.

The options of adjusting a torque drawn from the driven wheels by the generator operation of the electric motors, by coupling them to a load, and their realization in detail are at the discretion of the expert, for which reason this need not be addressed here in detail.

In summary, it represents itself as an essential advantage of the invention that in level and uphill travel only that output is drawn from the drive train that is just sufficient to reduce the fuel delivery to the internal combustion engine to zero. On downhill stretches, the driver is additionally relieved, since an intervention in the actual state of travel by additional actuation of further brake systems may be dispensed with. This is very comfortable primarily in the case when the travel resistance varies depending on the stretch of road. Moreover, continuous actuation of additional brake systems is not always possible.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 4a through 4c, are simplified block diagrams of preferred configurations of the inventional drag torque control;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
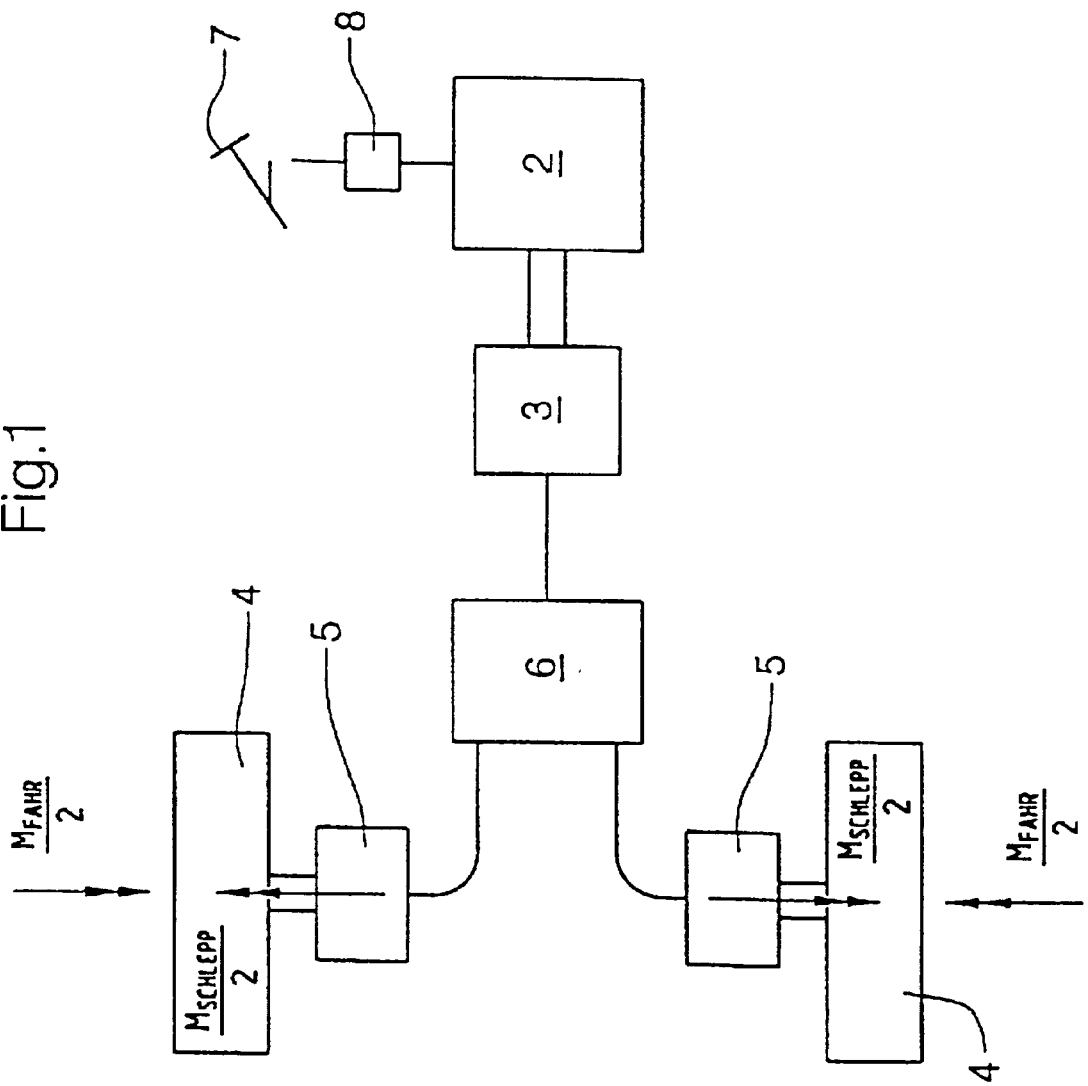
FIG. 1 is a schematic illustration of a diesel electric drive system.

FIG. 1 depicts in a simplified illustration a diesel electric drive system and the transmission of the output. A drive system 1 comprises at least one engine, here in the form of an internal combustion engine 2 configured as a diesel engine, an electric machine 3 allowing mechanical coupling to the internal combustion engine 2 and operation as generator in travel operation, at least one further electric motor 5 driving one driven wheel 4 at least indirectly and coupled electrically to the electric machine 3 operable as generator. Electric coupling 6 can be effected, e.g., by way of an intermediate direct voltage circuit. The electric machine 3 and the electric motor 5 are preferably configured as transverse-flow machines. The electric motor 5, as illustrated, may be arranged such that it acts as direct drive for the driven wheel 4. Conceivable, however, is also an output splitting to both driven wheels by way of appropriate transfer cases.

The internal combustion engine 2 drives, in the normal travel operation, the driven wheels 4. The output $P_{AM}$ to be produced by it is composed of at least one first output portion $P_{AM1}$ and a second output portion $P_{AM2}$. The first output portion is the part necessary to surmount the inherent resistances of the internal combustion engine and to operate it at idling speed of rotation. The second output portion is the part serving the acceleration of the vehicle or maintenance of a specific constant speed. Derived from it may be essentially the torque $M_{AR}$ generated on the driven wheels. Said second mechanical output portion produced by the internal combustion engine 2 is converted by the electric machine 3, operable as generator, to electric output which, in turn, is fed to the electric motor 5 by way of electric coupling 6, and thus to the driven wheels 4.

Coupled to an output actuator 8 (FIG. 1) of the internal combustion engine 2 is an actuating member, for example, in the form of an accelerator pedal or accelerator lever 7 or an actuator element configured differently, with which the driver's desire with respect to a specific travel performance can be expressed. Depending on the type of internal combustion engine used, either a throttle valve or a fuel injection system may serve as output actuator, that is, elements which influence the amount of fuel consumed. The output actuator 8 of the internal combustion engine 2 is upon release of the accelerator pedal or accelerator lever 7 adjusted to the effect that the idling operation of the internal combustion engine 2, i.e., the idling speed of rotation $n_{motor}$, is just being maintained.

To artificially generate a drag torque $M_{drag}$, the electric motors 5 driving the driven wheels are upon release of the accelerator pedal 7 after acceleration or retardation operated as generators, and the output generated by the electric motors 5 as generators and withdrawn from the driven wheels is used to drive the internal combustion engine 2 via the electric coupling 6 and the electric machine 3, which then is operated as a motor. The objective is achieving the deceleration operation of the internal combustion engine.

In gradient travel, the vehicle possesses upon release of the accelerator pedal or accelerator lever 7, due to the gradient power output, an increasing kinetic energy $E_{kin}$ of which results an increase of the travel torque $M_{drive}$. At increasing and complete conversion of the output, or torque, prevailing on the driven wheels, by the electric motors 5 operated as generators, to mechanical output delivered to the internal combustion engine, this would result in an increase of the artificially generated drag torque, to the effect that the speed of travel of the vehicle continues to be reduced ever more, due to the reduction of its kinetic energy, since a braking torque is generated on the driven wheels 4. To avoid this effect, the invention provides for withdrawing from the electric motors 5 operated as generators, at least upon release of the accelerator pedal or accelerator lever 7, only as much output as is just sufficient to put the internal combustion engine 2 at least idling, or in a state at which a deceleration shutoff occurs. The latter takes place via the engine control, which then controls the fuel supply to zero, e.g., by appropriate positioning of the fuel fill cam, etc.

By analogy, this can be realized also in level travel. Release of the accelerator pedal or accelerator lever 7 also causes a resetting of the output actuator 8, so that merely the internal combustion engine continues idling. Here, too, at least a first output portion is withdrawn from the vehicle, notably from the driven wheels 4, by the generator operation of the electric motors 5, said output portion being just sufficient to put the internal combustion engine 2 in deceleration operation. This first output portion is normally so small that only an unnoticeable retardation of the vehicle is accomplished in level travel. Drawn from the driven wheels 4, this first output portion first increases at very low speeds with the increase in speed until a specific speed is reached, from which forward an output withdrawal such can be effected so that always a deceleration shutoff will be accomplished and the speed of travel is simultaneously only unnoticeably reduced.

Figure 2:
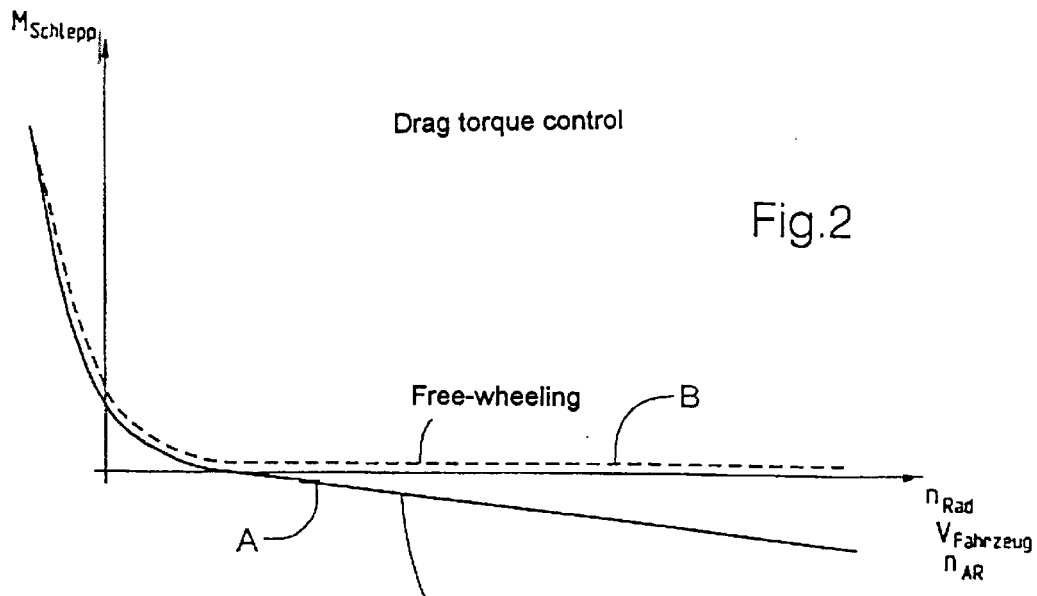
FIG. 2 is a diagram of the drag torque pattern depending on the travel torque, in a vehicle with conventional mechanical coupling between internal combustion engine and power output.

FIGS. 2 and 3 comparatively illustrate the drag torque pattern in conventional mechanical drive trains and in an inventionally operated diesel electric drive system. The drag torque pattern and the output pattern $M_{drag}$ as well as $P_{drag}$, respectively, are plotted each in a diagram in contingence on the speed of travel vehicle, or the speed of rotation of the driven wheels $n_{AR}$.

From FIG. 2 it follows that in a conventional drive train, due to the mechanical coupling between the engine, i.e., internal combustion engine, and the driven wheels 4, an increasing drag torque $M_{drag}$ is noted with an increasingly prevalent travel torque $M_{drive}$ on the wheels, since the internal combustion engine 2 is being driven by the power output, that is, the driven wheels 4. The increase in kinetic energy of the vehicle at gradient travel entails then an increase in drag torque $M_{drag}$, that is, a rise of the resistances to be surmounted in the drive train. This results in a retardation of the vehicle due to the withdrawal of kinetic energy. Said drag torque, however, is in gradient travel often insufficient to keep a speed constant, requiring the employment of further additional brake systems to guarantee maintenance of the speed, which for the driver means the actuation of further brake systems.

In contrast, the solution according to the invention enables fuel savings without great additional engineering and control- or regulation related expense with unnoticeable retardation in level travel, and with appropriate drag torque control the maintenance of the travel speed in gradient travel.

Figure 3A:
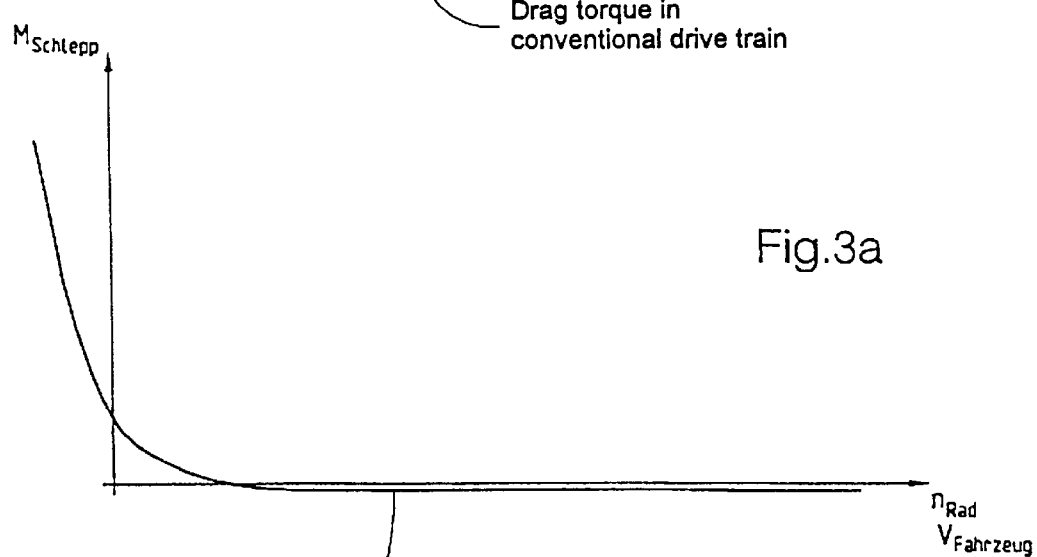
FIGS. 3a, 3b, are diagrams of the drag torque and output pattern in a diesel electric drive system as generated by the inventional drag torque control.
Figure 3B:
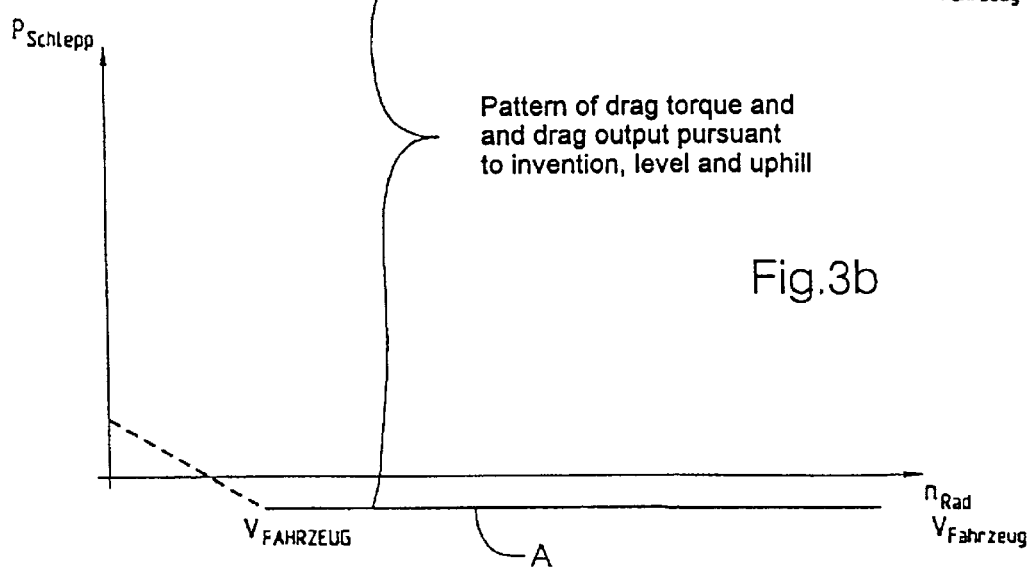

FIGS. 3a and 3b depict the inventional patterns of the drag torque $M_{drag}$ and of the drag output $P_{drag}$ in level travel and uphill travel.

FIGS. 3a and 3b make it clear that according to the invention an increasing drag torque $M_{drag}$, or drag output $P_{drag}$, is at first generated with increasing speed of travel, which, beginning at a specific speed $v_{vehicle-A}$, is just sufficient to put the internal combustion engine in deceleration operation, thus triggering deceleration shutoff. Generated from this speed of travel forward, with its increase, is always at least only this drag torque $M_{drag1}$ that is sufficient for deceleration operation.

Figure 4A:
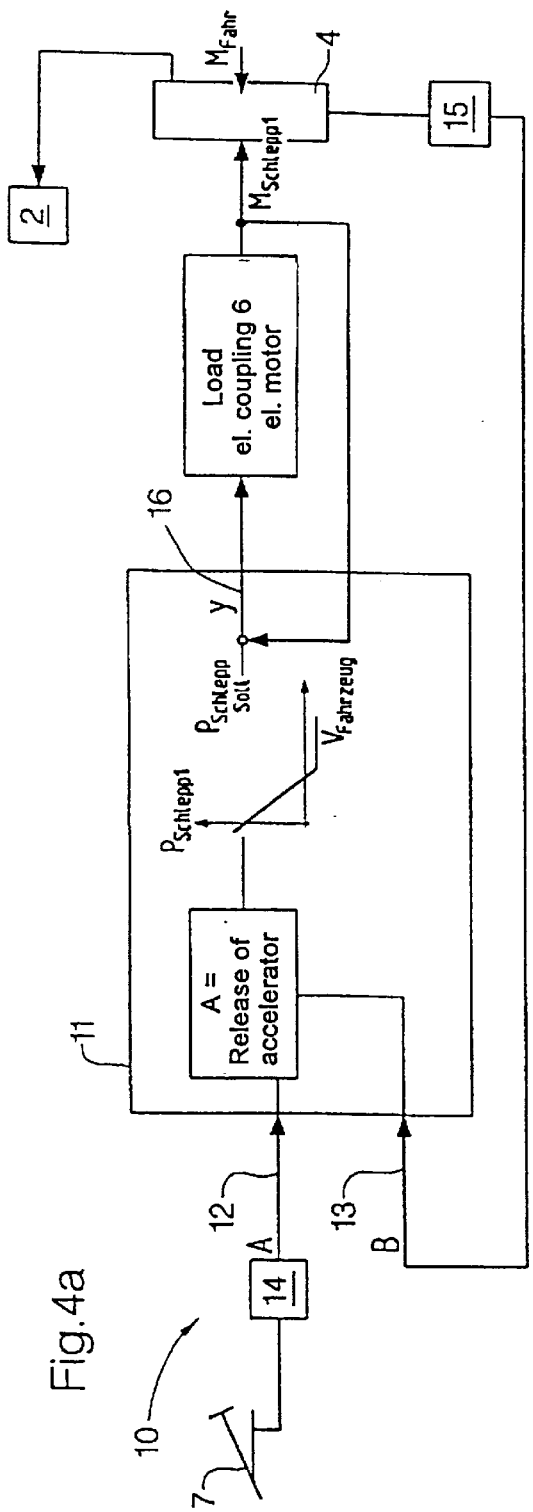
Figure 4B:
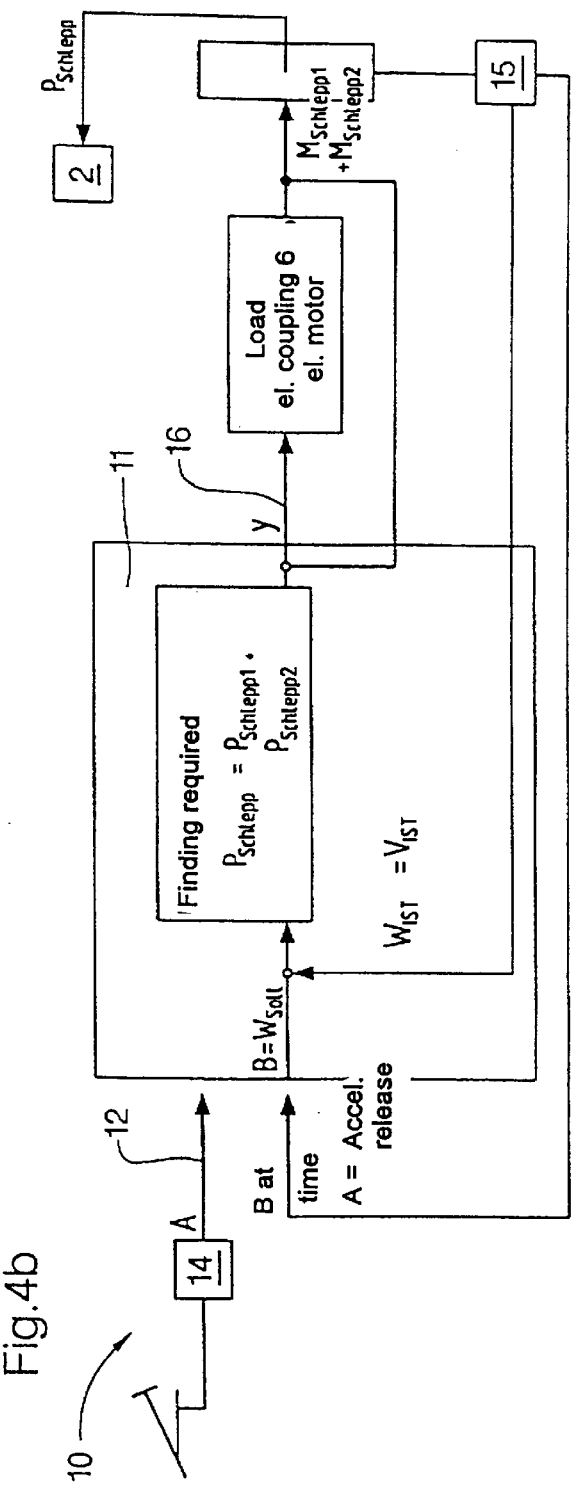

FIGS. 4a through 4c depict with the aid of block diagrams the control or regulating system required for the inventional application of the method and their mode of operation. Identical elements are referenced identically.

FIG. 4a shows a control system 10, processing at least two input variables. A first input variable A is formed by a variable characterizing at least indirectly the state of actuation of actuating member 7 and/or a system for presetting the driver's desire. The variable characterizing the state of actuation of actuating member 7 is preferably the angular position of the accelerator pedal or accelerator lever 7. A second input variable B is formed by a variable describing, at least indirectly, the actual state of travel at the time of releasing the actuating member 7 and/or activating or actuating a system presetting the driver's desire. This variable, e.g., may be the actual speed of travel $v_{Ist}$. The control system features for that purpose at least one controller 11 with at least two inputs for the input variables A and B, respectively a first input 12 and a second input 13. The first input 12 can for that purpose be coupled to a system 14 detecting the state of actuation of the actuating member 7. The second input can be connected to a system 15 detecting a variable that describes the actual state of travel. This system 15 may be configured, e.g., as an rpm-measuring system.

Depending on the variable B characterizing at least indirectly the state of travel and preferably the speed of travel, a drag torque to be generated is determined. Said drag torque corresponds to the output to be drawn from the drive train, specifically the driven wheels 4. It should be noted here that with very low speeds an output reduction on the driven wheels would not suffice to put the internal combustion engine in deceleration operation. Moreover, a complete output reduction may lead to the complete braking of the vehicle, which is not an objective. Therefore, an allocation of drag torque is effected such that at low speeds an increasing drag torque is generated with increasing drag torque, beginning at a specific speed, is always sufficient to put the internal combustion engine in deceleration. The control or regulating unit features, for that purpose, an output 16 which for adjusting the output to be withdrawn from the driven wheels 4 at least of the first output portion $P_{drag}$ is coupled to the loads, or electric motors, and/or to the electric coupling 6, and on which output an actuating variable Y is emitted for setting a specific drag torque $M_{drag}$, or a specific drag output $P_{drag}$.

FIG. 4b shows a block diagram for drag torque control including the function Constant Speed in Gradient Travel. The control system 10 includes for that purpose the same inputs A and B—as described in FIG. 4a. The variable determined at the time of actuating the system or releasing the accelerator pedal or accelerator lever 7 and characterizing the state of travel is set as the command variable W of a feedback control. This variable is preferably a speed $W_{debit}$ determined from the actual speed of rotation at that time, but may also be an acceleration. It is adjusted with the aid of the drag torque control included in the controlled system, that is, the command variable $W_{debit}$ is continuously compared to the determined actual value $v_{Ist}$. Once the actual value exceeds the set value, a difference is determined in keeping with the deviation between both values, for generation of the second output portion $P_{drag2}$ to be used for braking the vehicle, and the overall drag output to be generated, and thus the entire output to the withdrawn from the driven wheels by the generator operation of the electric motors 4 is adjusted accordingly. The second output portion $P_{drag2}$ can be converted to heat or, however, stored in an accumulator system. The drag torque control is employed here for control to constant travel speed in gradient travel and is an integral part thereof.

In a further configuration according to FIG. 4c, in the presence of a further brake system referenced 19 here, and its actuating system being referenced 20, the latter can be activated additionally during drag torque control. An option is leaving the drag torque control with respect to the drag torque to be adjusted as set at the time of actuating the brake system and additionally adjusting with the brake system a braking torque to be generated according to its actuation in normal operation, reduced by the braking torque generated with the drag torque control. Another conceivable option is adding both torques to be generated to one another. Furthermore, it would be conceivable also to return the drag torque control to a torque in keeping with the first output portion $P_{drag1}$ and generating the braking torque solely with the additional brake system 19. Selecting the coordination of both systems with one another and balancing with respect to their priority is at the discretion of the expert, for which reason these need not be addressed in detail. The actual speed prevailing after completion of actuating the brake system or the variable characterizing the actual state of travel, at least indirectly, is then assigned to the set value input of the feedback control. Coordinated with both, electric motors 5 and brake system 19, is then preferably the same control and regulating system 10. The individual activation processes are preferably realized by way of the programmable function occurring in the control or regulating system. The automatic new setting, or assignment of the set value, i.e., of the command variable of the controlled system, can be effected, e.g., by means of appropriately programmed algorithms. Electric circuits and logic linkages are conceivable as well.

Figure 5:
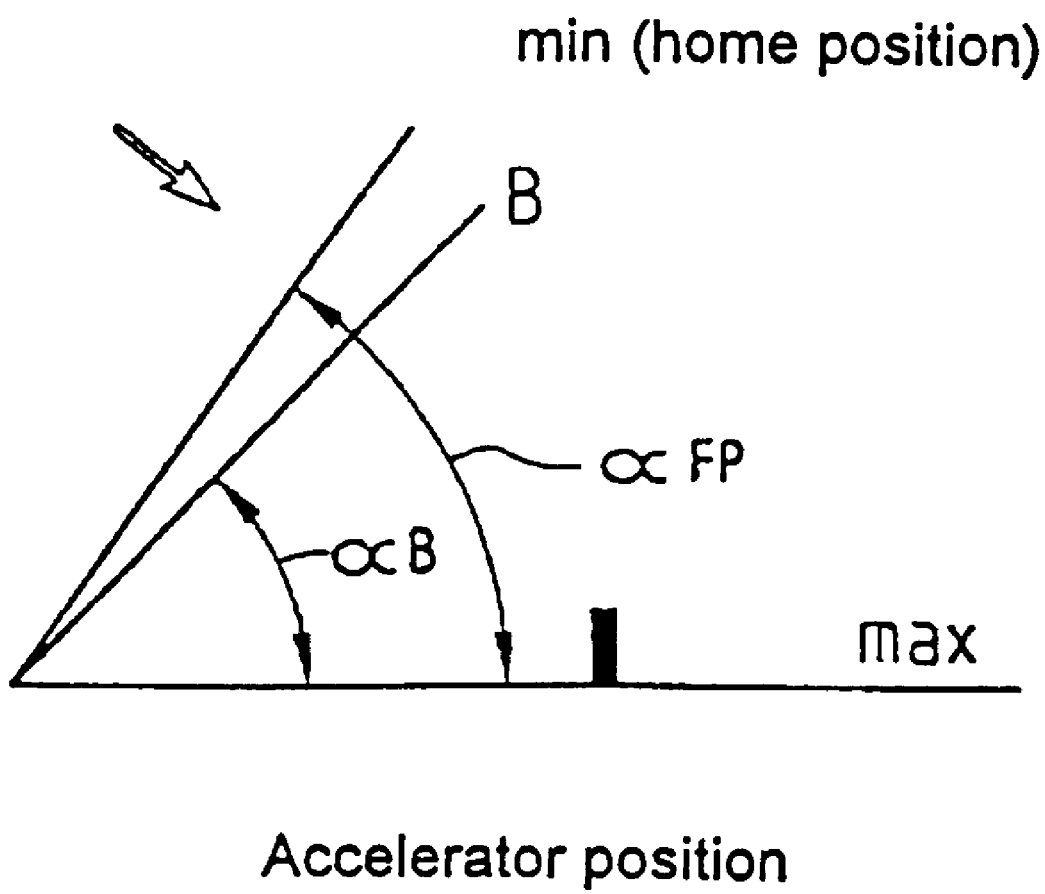
FIG. 5 is schematically an option to realize the sliding transition upon activation and deactivation of the drag torque control.

FIG. 5 illustrates a favorable configuration for avoiding an abrupt transition between drive torque and drag torque upon activation of the drag torque control or between drag torque and drive torque upon deactivation. The transition is preferably sliding. Said transition can be realized by means of programmable functions. Moreover, as illustrated in FIG. 5, the angular adjustment on the actuating member, that is, on the accelerator pedal or accelerator lever 7, may be utilized as the basis for realizing a sliding transition. In the process, a specific accelerator pedal angle $alpha_B$ characterizing a specific accelerator position B that differs from the possible limit positions of release or flooring is utilized to make the adjustment of the output actuator 8 on the internal combustion engine 2 already at an earlier time, when the accelerator pedal 7 has not been released yet completely, to the effect that the output generated by the internal combustion engine goes to zero and the internal combustion engine is operated only in idling. From this time forward, until reaching the limit position that signals the release of the accelerator pedal, a gradual transition to the drag torque to be adjusted occurs, e.g., by means of a programmable function.

What is claimed is:

1. A method to influence the drag torque in a drive train, comprising the steps of:

providing at least one electric motor for driving a driven wheel of a vehicle, an internal combustion engine, and an electric machine capable of mechanically coupling to said internal combustion engine and operating as a generator and as a motor, said electric motor capable of electric coupling to said electric machine, and an actuating member connected to an actuator of said internal combustion engine for presetting a driver's desire for movement of vehicle;

operating said electric machine as a generator on one of release of the actuating member and actuation of a system for presetting the driver's desire for movement;

generating a first output portion from said electric machine drawn by the electric motor from the driven wheel;

feeding said first output portion to the electric machine for driving said internal combustion engine; and selecting said first output portion such that the internal combustion engine operates at least at a speed of rotation greater than or equal to an idling speed of rotation and on which the internal combustion fuel supply is interrupted completely by means of a control coordinated with said internal combustion engine.

2. The method of claim 1 further comprising the steps of:

determining a variable characterizing the actual state of vehicle travel at least from the time of actuating member release or presetting the driver's desire for movement in at least a plurality of selectable time periods;

setting said determined value as a set value for feedback control;

comparing said set value to the actual value state; and drawing a second output portion from the driven wheel by the electric motor operated as a generator for generating a braking torque when the actual value exceeds said set value.

3. The method of claim 2 in which said determining step includes that the speed of vehicle travel is chosen as said variable characterizing the actual state of travel.

4. The method of claim 2 in which said determining step includes that the acceleration of vehicle travel is chosen as said variable characterizing the actual state of travel.

5. The method of claim 1 further comprising the steps of:

providing at least one further brake system for activation;

determining at least one variable for describing the actual state of vehicle travel at least from the time of brake system deactivation forward in a plurality of selectable time periods;

setting said determined value as a set value for feedback control;

comparing said set value to the actual value state; and drawing a second output portion from the driven wheel by the electric motor operated as a generator for generating a braking torque when the actual value exceeds said set value.

6. The method of claim 5 further comprising the step of:

deactivating drag torque control when said further brake system is activated, the deactivating step accomplished by not changing the output portions drawn from the driven wheel so than additional braking torque is generated by said further brake system.

7. The method of claim 6 further comprising the step of:

additively superimposing said second output portion drawn from the driven wheels and the brake torque generated by the brake system.

8. The method of claim 6 in which said provided brake system generates a braking torque derived from the difference between the braking torque desired according to brake system actuation and the torque corresponding to the second output portion.

9. The method of claim 5 further comprising the step of:

deactivating drag torque control when said further brake system is activated, the deactivating step accomplished that from the time of brake system activation forward only the first output portion is drawn from the driven wheels and a braking moment is generated merely with the braking system.

10. The method of claim 5 further comprising the steps of:

making a maximum selection between the second output portion drawn from the driven wheels at the time of brake system actuation and braking torque desired according to the actuation of the braking system; and generating a braking torque accordingly with only either the brake system or use of the second output portion.

11. The method of claim 1 in which transition from drive torque to drag torque and vice versa is realized without abruptness.

12. The method of claim 11 further comprising the step of:

running a programmed routine for influencing the output drawn from the driven wheels from the time of release of the actuating member or the presetting of the driver's desire of vehicle movement.

13. The method of claim 11 further comprising the step of:

defining with the actuating member a specific position differing from one of the two limit positions of the actuating member;

adjusting the output actuator of the internal combustion engine such that the output generated by the internal combustion engine equals zero when the actuating member is moved to said specific position; and adjusting the drag torque gradually on the actuating member sweeping a range from the specific position to a limit position.

14. The method of claim 13 in which the specific position is continually redefined.

15. The method of claim 13 in which the definition of the specific position is preset.

16. The method of claim 11 further comprising the step of:

making the transition from drive torque to drag torque and vice versa depending on the speed of rotation of the internal combustion engine.

17. The method of claim 16 comprising the step of:

delaying the transition from and to drag torque control by selection of a particular deviation between the actual speed of rotation of the internal combustion engine and the speed of rotation at which deceleration shutoff of the internal combustion engine occurs.

18. A drive unit for vehicle, said drive unit comprising:

at least one electric motor driving at least one driven wheel;

an internal combustion engine having an actuator;

an electric machine capable of mechanical coupling to said internal combustion engine and operation as a motor and as a generator, each said electric motor operable as a generator and capable of electric coupling to said electric machine, said motor having a motor actuator;

an actuating member allowing at least indirect coupling to said actuator; and a control system including:

a detection system for creating a variable describing the actual state of travel of the vehicle;

a first input coupled to said actuating member;

a second input coupled to said detection system;

and a first output coupled to said motor actuator for tuning a first output portion to be drawn from said driven wheel in the generator operation of said electric motor and fed to said internal combustion engine; and means for determining said first output.

19. The drive unit of claim 18 in which said means is a programmable function.

20. The drive unit of claim 18 in which said means is an electronic circuit.

21. The drive unit of claim 18 in which said control system includes:

a comparator system for comparing a value of a variable characterizing the actual state of travel of the vehicle, and setting a set value to a current actual state of travel value; and at least one assignment system subordinate to said comparator system and determining a further second output portion to be additionally drawn from the driven wheels, said assignment system linked to said motor actuator for tuning the overall output drawn from the driven wheel in the generation operation of said electric motor.

22. The drive unit of claim 21 further including an accumulator unit for storing the second output portion.

23. The drive unit of claim 18 further comprising:

at least one additional brake system; and means for presetting the priority between said additional brake system and control of the output drawn from said driven wheel.

24. The drive unit of claim 23 in which presetting means is a programmable function.

25. The drive unit of claim 18 in which said presetting means is an electronic circuit.

26. The drive unit of claim 18 in which said electric motor is configured as a transverse-flow machine.

27. The drive unit of claim 18 in which said electric machine is configured as a transverse-flow machine.

* * * * *